US010090074B2

(12) United States Patent
Sun et al.

(10) Patent No.: US 10,090,074 B2
(45) Date of Patent: Oct. 2, 2018

(54) LIGHT SOURCE MODULE (71) Applicant: PlayNitride Inc., Tainan (TW)

(72) Inventors: Sheng-Yuan Sun, Tainan (TW); Wen-Jie Lu, Tainan (TW); Gwo-Jiun Sheu, Tainan (TW)

(73) Assignee: PlayNitride Inc., Tainan (TW)

( * ) Notice: Subject to any disclaimer, the term of this patent is extended or adjusted under 35 U.S.C. 154(b) by 5 days.

(21) Appl. No.: 15/342,564

(22) Filed: Nov. 3, 2016

(65) Prior Publication Data

US 2018/0075940 A1    Mar. 15, 2018

(30) Foreign Application Priority Data

Sep. 13, 2016    (TW) .............. 105129888 A (51) Int. Cl.
  *G21K 5/10*    (2006.01)
  *F21V 7/08*    (2006.01)
(52) U.S. Cl.
  CPC .  *G21K 5/10* (2013.01); *F21V 7/08* (2013.01)
(58) Field of Classification Search
  CPC ................................. G21K 5/10; F21V 7/08
  USPC ....................... 362/296.06–296.08
  See application file for complete search history.

(56) References Cited

U.S. PATENT DOCUMENTS

| 6,559,600 B1* | 5/2003 | Wada ............... H01J 61/86 313/113 |
| 2010/0157605 A1* | 6/2010 | Chang ............... F21V 7/08 362/294 |

FOREIGN PATENT DOCUMENTS

| TW | M295725 | 8/2006 |
| TW | 200700784 | 1/2007 |
| TW | 200924183 | 6/2009 |

OTHER PUBLICATIONS

"Office Action of Taiwan Counterpart Application," dated Apr. 21, 2017, p. 1-p. 4.

* cited by examiner

*Primary Examiner* — Sean Gramling
(74) *Attorney, Agent, or Firm* — J.C. Patents (57) ABSTRACT A light source module is adapted to perform a light irradiation process on an object. The light source module includes a transparent cover, a reflector and a light emitting unit. The reflector covers the transparent cover, and the reflector and the transparent cover define a containing space. The light emitting unit is disposed inside the containing space. A perpendicular working distance from the transparent cover to the object is WD, a semi-minor axis of the reflector is A, and a semi-major axis of the reflector is B, wherein WD=2 A-3 to 3.5 A-3, and B=2 A to 2.5 A.

11 Claims, 9 Drawing Sheets

LIGHT SOURCE MODULE

CROSS-REFERENCE TO RELATED APPLICATION

This application claims the priority benefit of Taiwan application serial no. 105129888, filed on Sep. 13, 2016. The entirety of the above-mentioned patent application is hereby incorporated by reference herein and made a part of this specification.

BACKGROUND OF THE INVENTION

Field of the Invention

The invention relates to an optical module, particularly to a light source module.

Description of Related Art

In general, curing may be roughly classified into two types: photocuring and thermal curing. The main principle of photocuring is to irradiate a material (e.g., a photopolymer) formed of a photocurable substance with high intensity UV light so as to induce a polymerization reaction, thus completing the photocuring process. However, most of current photocuring devices facilitate the photocuring reaction by increasing total illuminance of illumination for photocuring, and this method causes large energy consumption and cannot obtain satisfactory curing speed and curing results.

SUMMARY OF THE INVENTION

The invention provides a light source module adapted to perform a light irradiation process on an object.

The light source module according to the invention is adapted to perform a light irradiation process on an object. The light source module includes a transparent cover, a reflector and a light emitting unit. The reflector covers the transparent cover, and the reflector and the transparent cover define a containing space. The light emitting unit is disposed inside the containing space. A perpendicular working distance from the transparent cover to the object is WD, a semi-minor axis of the reflector is A, and a semi-major axis of the reflector is B, wherein WD=2 A-3 to 3.5 A-3, and B=2 A to 2.5 A.

In an embodiment of the invention, the reflector has an elliptical curved surface, and the light emitting unit is located at a first focus of the elliptical curved surface.

In an embodiment of the invention, the object is located outside the containing space and at a second focus of the elliptical curved surface.

In an embodiment of the invention, a material of the transparent cover is glass.

In an embodiment of the invention, the light emitting unit includes a plurality of light emitting diodes, the light emitting diodes being arranged in an array.

In an embodiment of the invention, each of the light emitting diodes is a Lambertian light emitting diode.

In an embodiment of the invention, a ratio between a dimension of each of the light emitting diodes and the semi-major axis is greater than 0.01.

In an embodiment of the invention, the dimension of each of the light emitting diodes is greater than or equal to 80 mil.

In an embodiment of the invention, a light emission axis of each of the light emitting diodes is parallel to the semi-major axis.

In an embodiment of the invention, a light emission axis of each of the light emitting diodes forms an angle with respect to the semi-major axis.

In an embodiment of the invention, the perpendicular working distance is smaller than or equal to 15 cm.

Based on the above, in the design of the light source module of the invention, the perpendicular working distance WD from the transparent cover to the object, and the semi-minor axis A and the semi-major axis B of the reflector satisfy the following relations: WD=2 A-3 to 3.5 A-3, and B=2 A to 2.5 A. Thus, when a light beam emitted by the light emitting unit is irradiated onto the object, irradiance of the light beam is more concentrated on the object. In other words, when a specified perpendicular working distance WD is given, the dimensions of the semi-minor axis A and the semi-major axis B of the reflector may be derived. Such design effectively controls, by optical design, the irradiance from the light emitting unit onto the object. Therefore, the light source module of the invention has better working performance.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the invention.

DETAILED DESCRIPTION OF DISCLOSED EMBODIMENTS

Figure 1A:
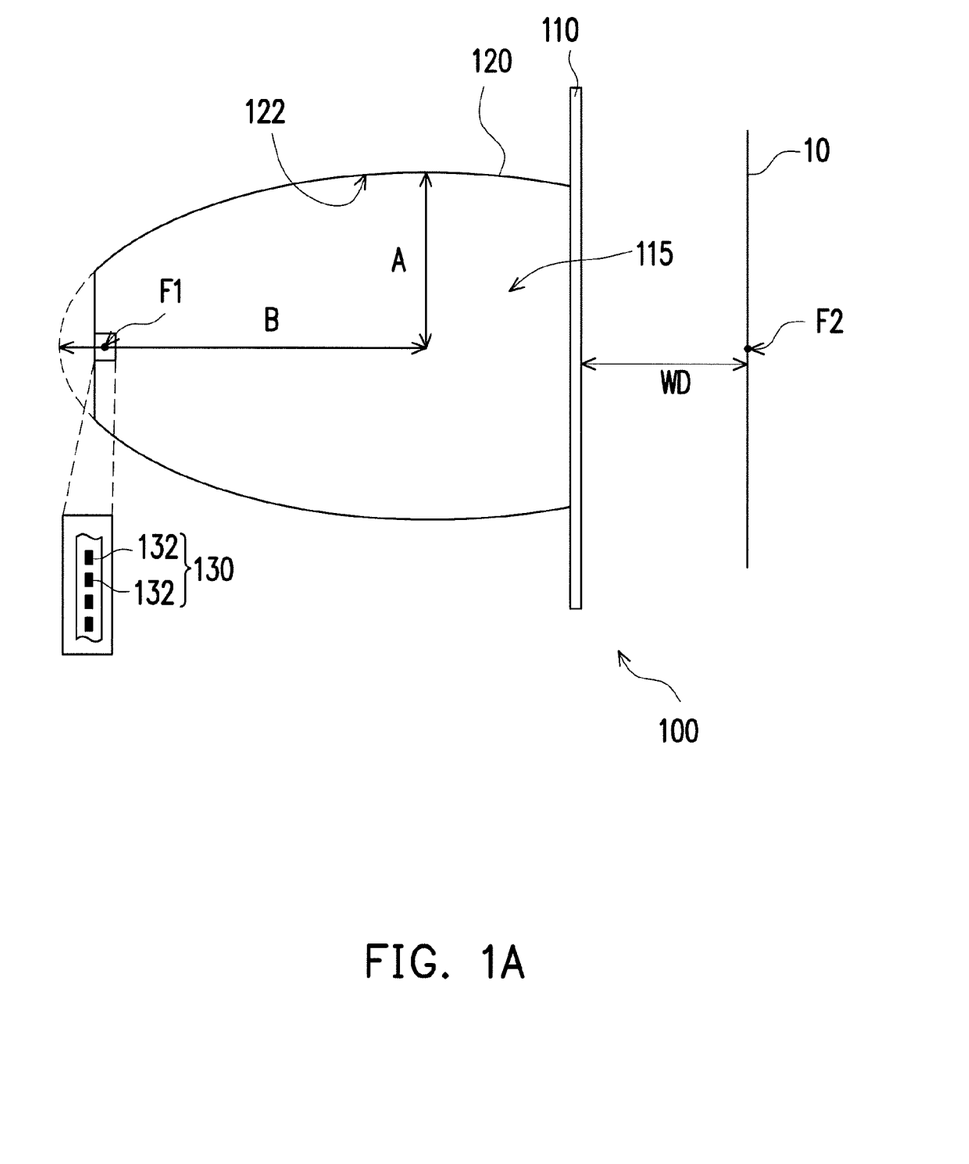
FIG. 1A illustrates a schematic view of a light source module according to an embodiment of the invention.

FIG. 1A illustrates a schematic view of a light source module according to an embodiment of the invention. Referring to FIG. 1A, a light source module 100 of the present embodiment is adapted to perform a light irradiation process on an object 10. In the present embodiment, for example, a light irradiation curing process is performed, and the object 10 is, for example, an object coated with a photopolymer (e.g., photocurable resin). The light source module 100 includes a transparent cover 110, a reflector 120 and a light emitting unit 130. The reflector 120 covers the transparent cover 110, and the reflector 120 and the transparent cover 110 define a containing space 115. The light emitting unit 130 is disposed inside the containing space 115. A perpendicular working distance from the transparent cover 110 to the object 10 is denoted by WD, a semi-minor axis of the reflector 120 is denoted by A, and a semi-major axis of the reflector 120 is denoted by B, wherein WD=2 A-3 to 3.5 A-3, and B=2 A to 2.5 A.

In detail, the transparent cover 110 of the present embodiment is a light transmissive cover allowing a light beam to pass therethrough, wherein a material of the transparent cover 110 is, for example, glass. The reflector 120 reflects a light beam so that the light beam is irradiated in the same direction, wherein a material of the reflector 120 is, for example, a metal or an alloy having reflectivity of 90% or higher. Particularly, the reflector 120 of the present embodiment has an elliptical curved surface 122. Herein, the semi-minor axis A and the semi-major axis B are respectively a semi-minor axis and a semi-major axis of an ellipse formed by extending the elliptical curved surface 122, and the light emitting unit 130 is located at a first focus F1 of the elliptical curved surface 122. Alternatively, the reflector 120 may include a plurality of sub-reflectors (not illustrated) having an elliptical curved surface and sharing a common focus. The invention is not limited thereto. It is worth mentioning that the reflector 120 may be a reflector at least having a semi-elliptical shape. Preferably, as shown in FIG. 1A, the reflector 120 in the present embodiment has a nearly three-quarter elliptical shape formed by extending the semi-elliptical shape. Accordingly, the reflector 120 is extended to be more like a complete ellipse and thus has a better light convergence function. On the other hand, the object 10 is located outside the containing space 115 and at a second focus F2 of the elliptical curved surface 122. Herein, the light emitting unit 130 includes, for example, a plurality of light emitting diodes 132, wherein the light emitting diodes 132 are arranged in an array (e.g., a 1*N matrix). Moreover, a ratio between dimensions (i.e., length and width) of each light emitting diode 132 and the semi-major axis B is greater than 0.01, and the dimensions of each light emitting diode 132 are greater than or equal to 80 mil. Since the light emitting diode 132 has greater dimensions than a conventional light emitting diode, light convergence efficiency is improved after reflection by the reflector 120. A light pattern of the light emitting diode 132 is preferably of a Lambertian type. Since a light emission angle of Lambertian light is around 120 degrees, the light convergence efficiency is improved after reflection by the reflector 120.

Figure 1B:
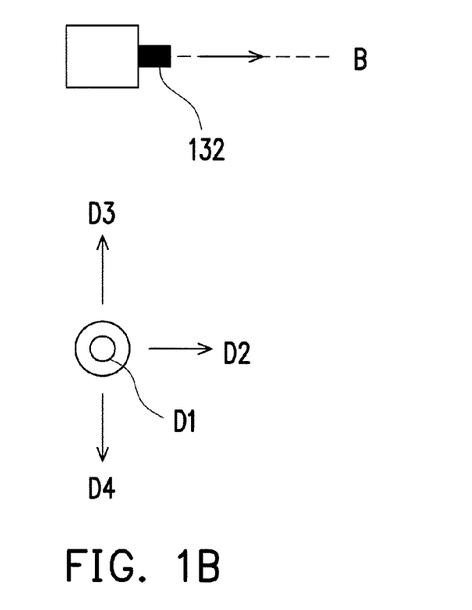
FIG. 1B illustrates a schematic view of an arrangement of a light emitting unit of the light source module in FIG. 1A.
Figure 1C:
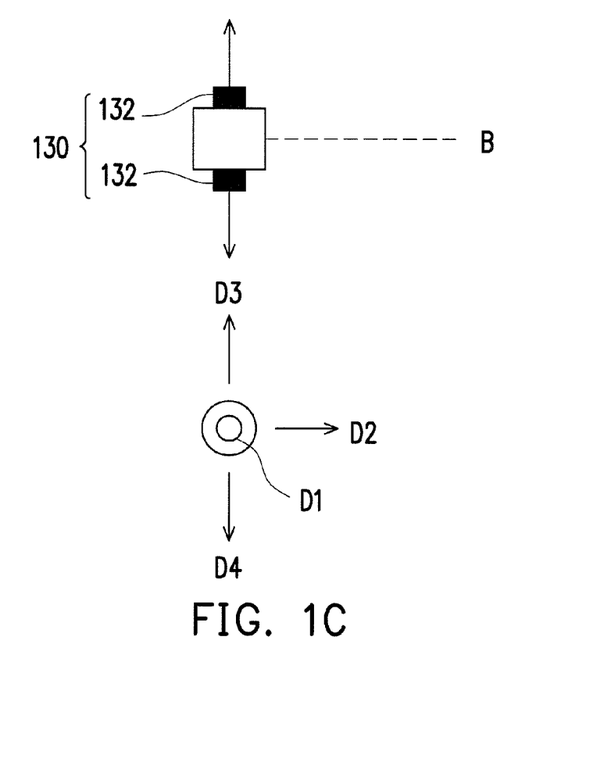
FIG. 1C illustrates a schematic view of another arrangement of the light emitting unit of the light source module in FIG. 1A.

It is worth mentioning that, referring to FIG. 1B, the light emitting diodes 132 of the light emitting unit 130 are, for example, arranged along a first direction D1. At this moment, a light emission axis of the light emitting diodes 132 is parallel to the semi-major axis B along a second direction D2, so that the light is effectively irradiated onto the object 10. Alternatively, referring to FIG. 1C, the light emitting diodes 132 of the light emitting unit 130 are arranged oppositely along the first direction D1. At this moment, the light emission axis of the light emitting diodes 132 forms an angle (e.g., an angle of 90 degrees) with respect to the semi-major axis B respectively along a third direction D3 and along a fourth direction D4. Such design enables the emitted light to be sufficiently irradiated onto the reflector 120 and prevents light leakage. In an embodiment not illustrated, the light emitting diodes 132 of the light emitting unit 130 are arranged along the first direction D1. At this moment, the light emission axis of the light emitting diodes 132 forms an angle with respect to the semi-major axis B either along the third direction D3 or along the fourth direction D4 (i.e., the light emitting diodes 132 are unidirectionally arranged). The invention is not limited thereto.

In the design of the light source module 100 of the present embodiment, the perpendicular working distance WD from the transparent cover 110 to the object 10, and the semi-minor axis A and the semi-major axis B of the reflector 120 satisfy the following relation: when WD=2 A-3 to 3.5 A-3, and B=2 A to 2.5 A. Thus, when a light beam emitted by the light emitting unit 130 is irradiated onto the object 10, irradiance of the light beam is more concentrated on the object 10. In other words, when a specified perpendicular working distance WD is given, the dimensions of the semi-minor axis A and the semi-major axis B of the reflector 120 may be derived. Such design effectively controls the irradiance from the light emitting unit 130 onto the object 10. Therefore, the light source module 100 of the present embodiment has better working performance. It is worth mentioning that the light source module 100 of the present embodiment is suitable for use for a short working distance. For example, the perpendicular working distance WD is preferably smaller than or equal to 15 cm so as to further improve the light convergence efficiency.

To verify effects of the invention, in the following descriptions, the aforementioned light source module 100 is used as a simulation model. Please refer to the following experimental data and simulation results.

Figure 2A:
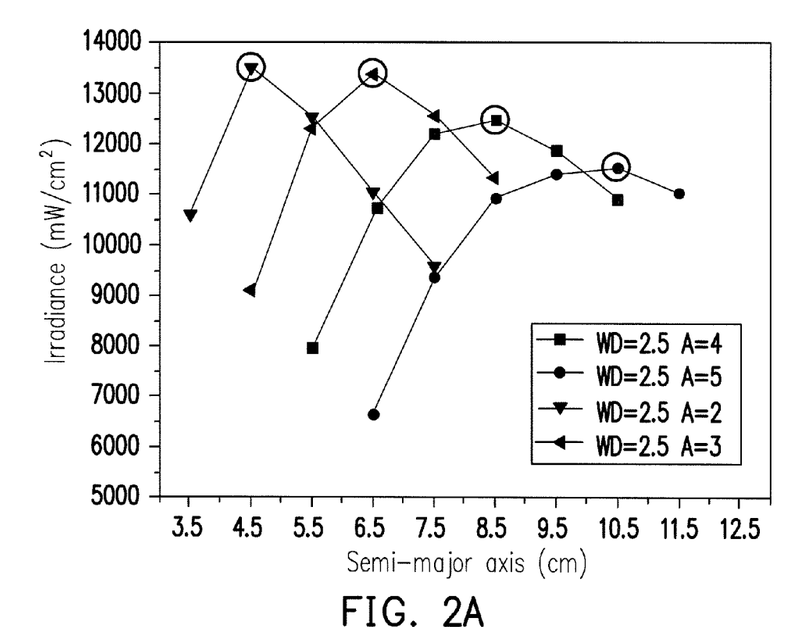
FIG. 2A to FIG. 2D are curve diagrams illustrating relationships between irradiance and semi-major axis B under the same perpendicular working distance WD and different semi-minor axes A.
Figure 2B:
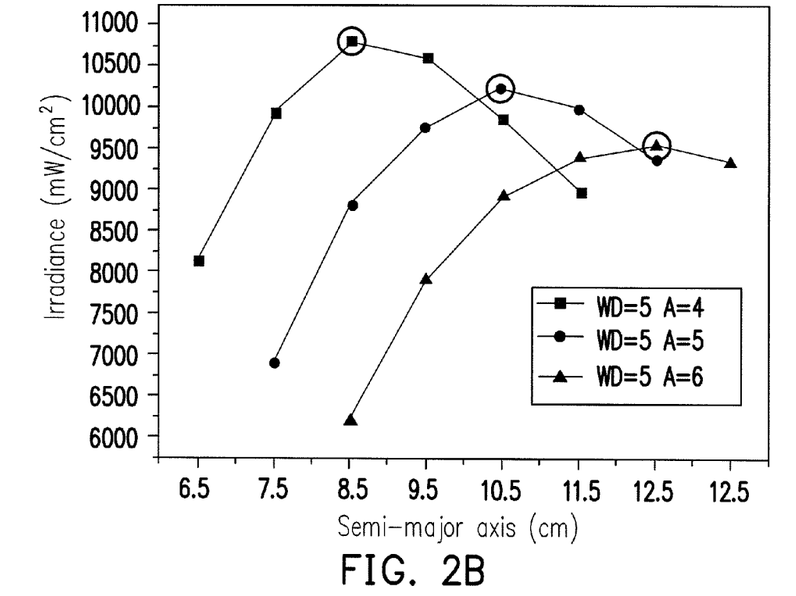
Figure 2C:
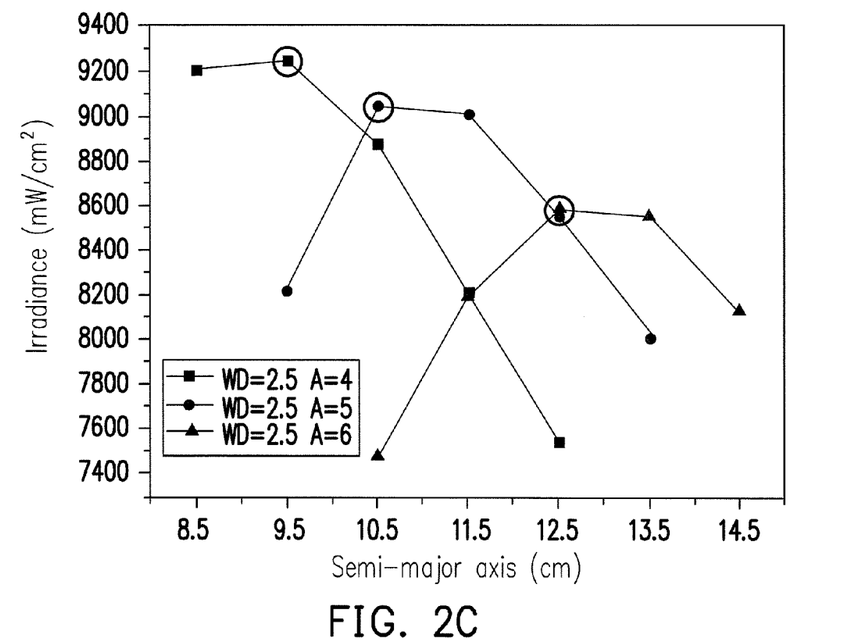
Figure 2D:
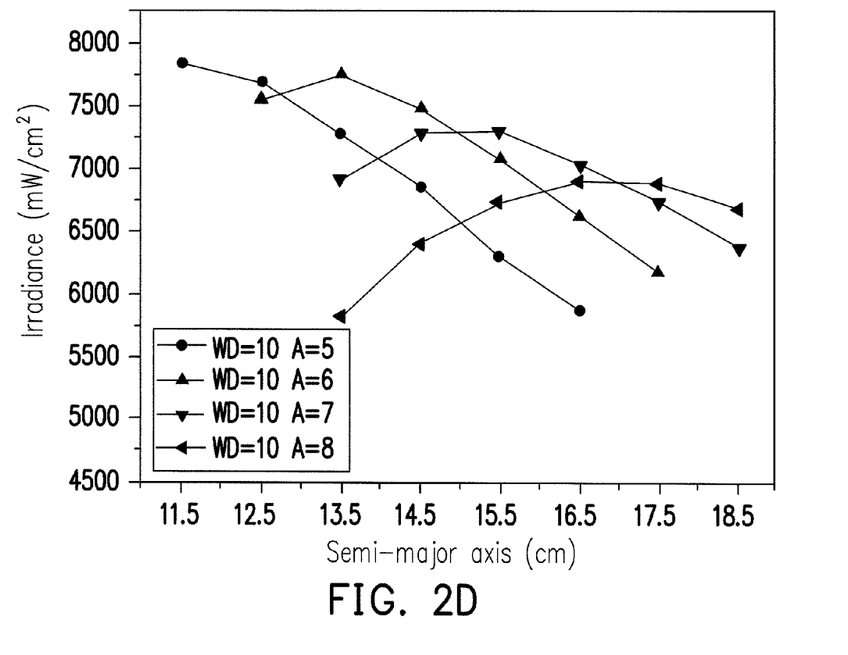
Figure 3:
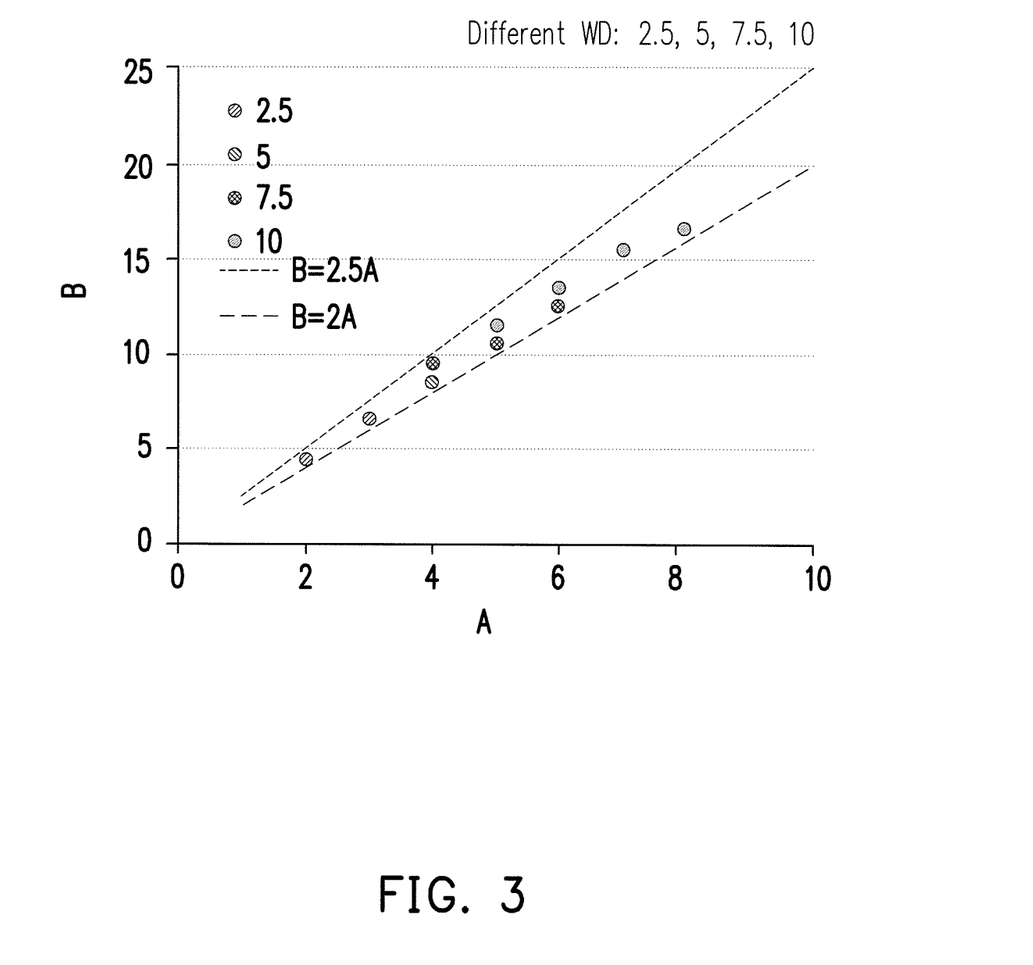
FIG. 3 is a curve diagram illustrating a relationship between semi-minor axis A and semi-major axis B under different perpendicular working distances WD.

FIG. 2A to FIG. 2D are curve diagrams illustrating relationships between irradiance and semi-major axis B under the same perpendicular working distance WD and different semi-minor axes A. FIG. 3 is a curve diagram illustrating a relationship between semi-minor axis A and semi-major axis B under different perpendicular working distances WD. It is worth mentioning that FIG. 2A to FIG. 2D illustrate the relationships between irradiance and semi-major axis B under the same perpendicular working distance WD and different semi-minor axes A, wherein the X axis represents the semi-minor axis A of the reflector 120, and the Y axis represents irradiance. FIG. 2A shows the curves between semi-major axis B and irradiance when the perpendicular working distance WD is fixed as 2.5 cm, and the semi-minor axes A are respectively 2 cm, 3 cm, 4 cm and 5 cm. FIG. 2B shows the curves between semi-major axis B and irradiance when the perpendicular working distance WD is fixed as 5 cm, and the semi-minor axes A are respectively 4 cm, 5 cm and 6 cm. FIG. 2C shows the curves between semi-major axis B and irradiance when the perpendicular working distance WD is fixed as 7.5 cm, and the semi-minor axes A are respectively 4 cm, 5 cm and 6 cm. FIG. 2D shows the curves between semi-major axis B and irradiance when the perpendicular working distance WD is fixed as 10 cm, and the semi-minor axes A are respectively 5 cm, 6 cm, 7 cm and 8 cm.

As shown in FIGS. 2A, 2B, 2C and 2D, each curve has a maximum value, the maximum value indicating the irradiance of the light beam emitted by the light emitting unit 130 at the maximum peak value in a light emission spectrum. That is, as shown in FIG. 2A, under the conditions of the fixed perpendicular working distance WD and the semi-minor axis A of respectively 2 cm, 3 cm, 4 cm and 5 cm, when the semi-major axis B has a length of respectively 4.5 cm, 6.5 cm, 8.5 cm and 10.5 cm, the irradiance of the light beam emitted by the light emitting unit 130 at the maximum peak value in the light emission spectrum is obtained.

For further clarification, Table 1 below shows the experimental data and simulation results of FIGS. 2A to 2D. FIG. 3 is a curve diagram illustrating, based on Table 1, a relationship between semi-minor axis A and semi-major axis B under different perpendicular working distances WD. Herein, WD denotes perpendicular working distance, A denotes semi-minor axis, B denotes semi-major axis, and K1 denotes a ratio between B and A.

TABLE 1

| WD | | 2.5 | WD | | 5 | WD | | 7.5 | WD | | 10 |
|---|---|---|---|---|---|---|---|---|---|---|---|
| A | B | K1 | A | B | K1 | A | B | K1 | A | B | K1 |
| 2 | 4.5 | 2.25 | 4 | 8.5 | 2.13 | 4 | 9.5 | 2.38 | 5 | 11.5 | 2.30 |
| 3 | 6.5 | 2.17 | 5 | 10.5 | 2.10 | 5 | 10.5 | 2.10 | 6 | 13.5 | 2.25 |
| 4 | 8.5 | 2.13 | 6 | 12.5 | 2.08 | 6 | 12.5 | 2.08 | 7 | 15.5 | 2.21 |
| 5 | 10.5 | 2.10 | | | | | | | 8 | 16.5 | 2.06 |

Referring to Table 1 and FIG. 3 together, it is known from the above that, when the perpendicular working distance WD has a fixed value, the semi-minor axis A and the semi-major axis B have a constant relationship, i.e., the semi-major axis B ranges between 2 times the semi-minor axis A and 2.5 times the semi-minor axis A, namely B=2 A to 2.5 A. That is, when the object 10 is placed in a fixed position, it is possible to make the irradiance of the light beam emitted by the light emitting unit 130 most concentrated on the object 10, simply by adjusting the semi-minor axis A and the semi-major axis B of the reflector 120 to satisfy B=2 A to 2.5 A.

Figure 4A:
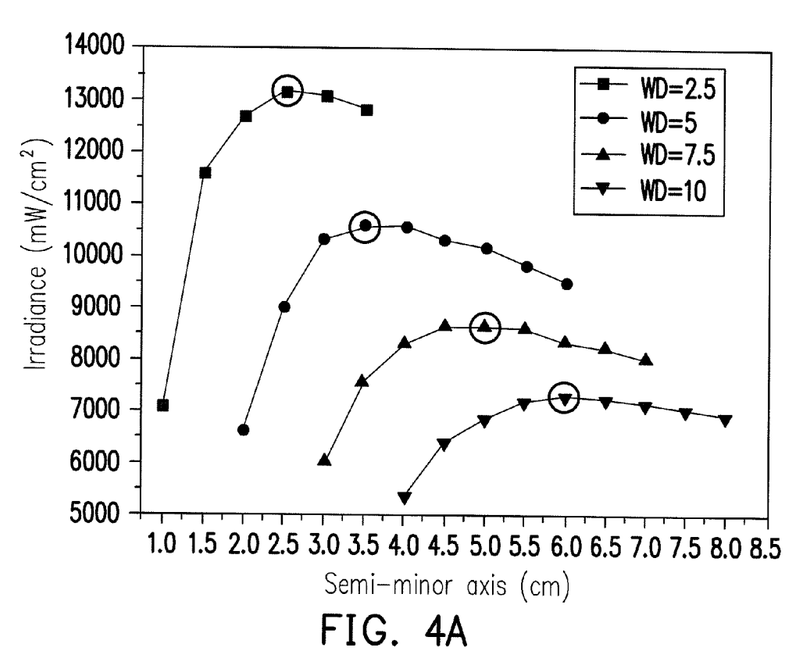
FIG. 4A is a curve diagram illustrating a relationship between irradiance and semi-minor axis A under a condition of B=2 A and the same perpendicular working distance WD.
Figure 4B:
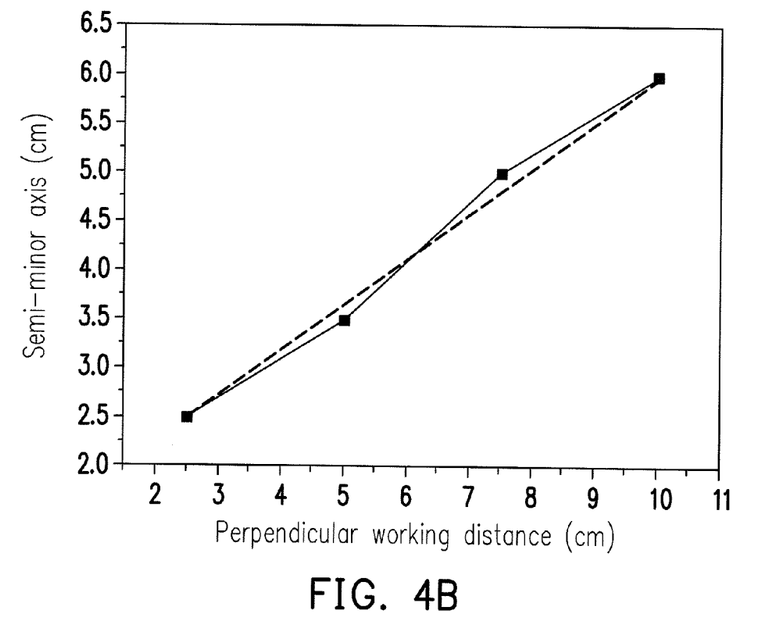
FIG. 4B is a curve diagram illustrating a relationship between perpendicular working distance WD and semi-minor axis A under a condition of B=2 A.
Figure 5A:
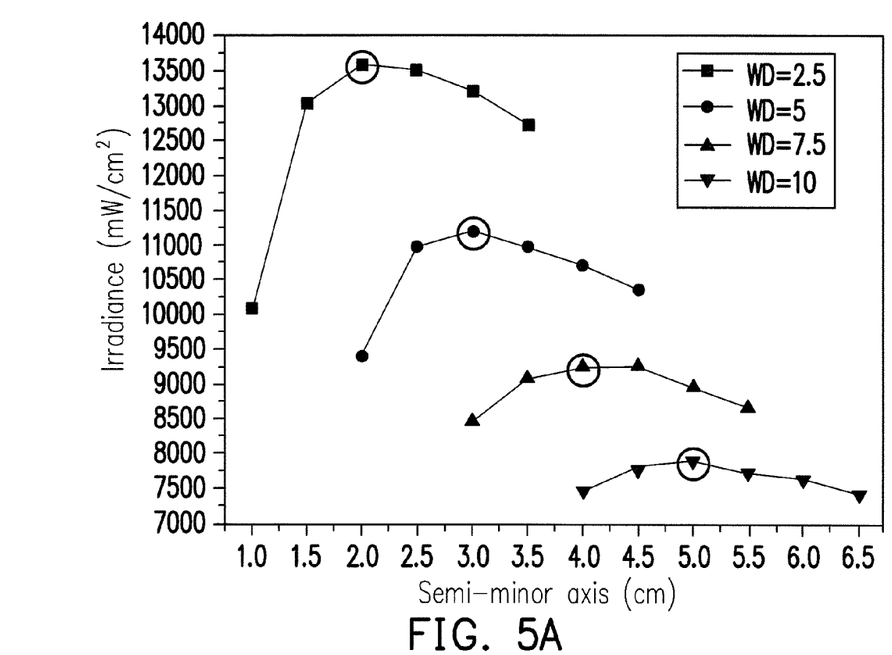
FIG. 5A is a curve diagram illustrating a relationship between irradiance and semi-minor axis A under a condition of B=2.3 A and the same perpendicular working distance WD.
Figure 5B:
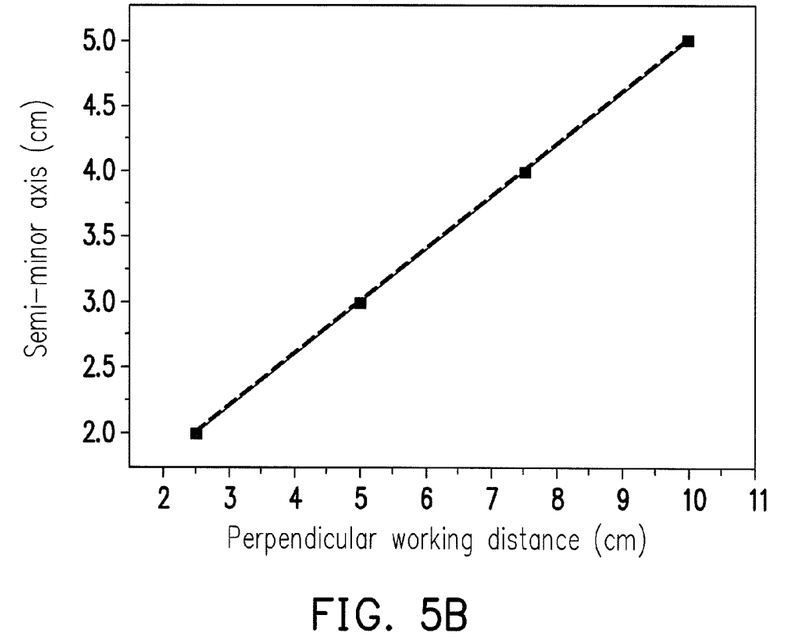
FIG. 5B is a curve diagram illustrating a relationship between perpendicular working distance WD and semi-minor axis A under a condition of B=2.3 A.
Figure 6A:
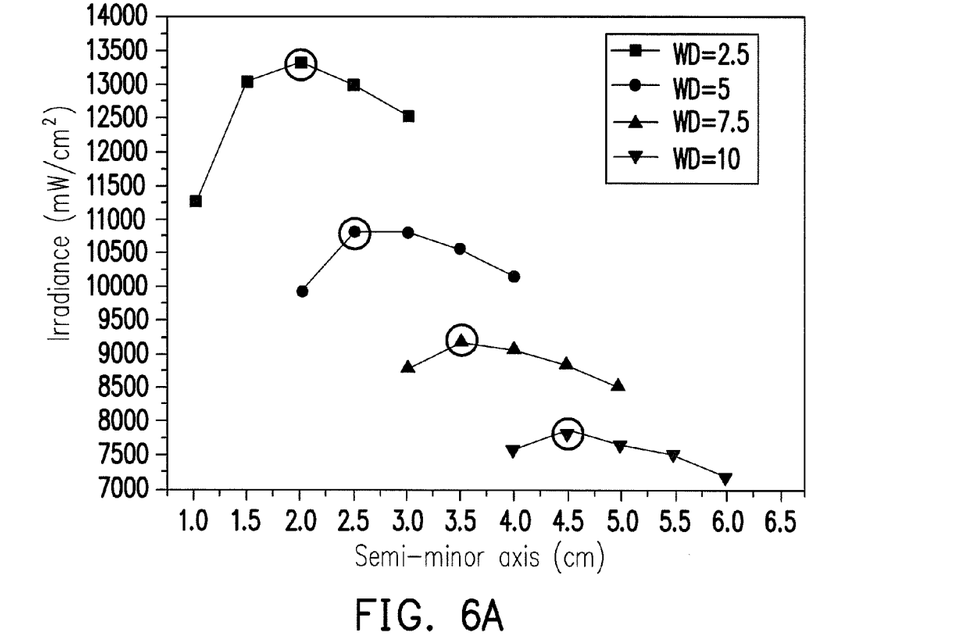
FIG. 6A is a curve diagram illustrating a relationship between irradiance and semi-minor axis A under a condition of B=2.5 A and the same perpendicular working distance WD.
Figure 6B:
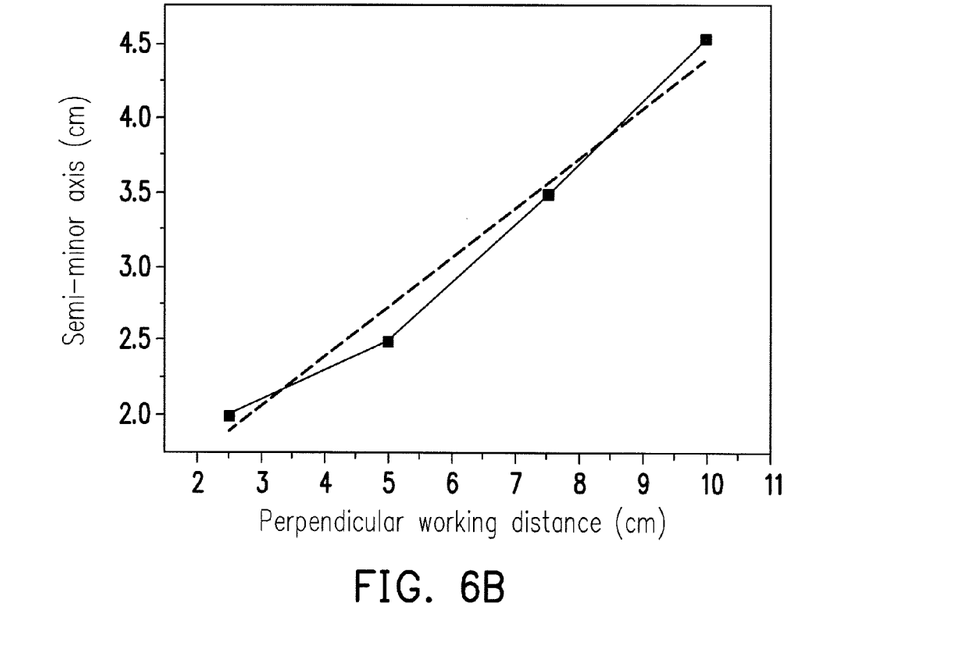
FIG. 6B is a curve diagram illustrating a relationship between perpendicular working distance WD and semi-minor axis A under a condition of B=2.5 A.

Next, FIG. 4A, FIG. 5A and FIG. 6A are respectively curve diagrams illustrating the relationships between irradiance and semi-minor axis A under conditions of B=2 A, 2.3 A and 2.5 A respectively and the same perpendicular working distance WD. FIG. 4B, FIG. 5B and FIG. 6B respectively illustrate the curves between perpendicular working distance WD and semi-minor axis A when B=2 A, 2.3 A and 2.5 A respectively. It is worth mentioning that FIG. 4A, FIG. 5A and FIG. 6A illustrate the relationships between irradiance and semi-minor axis A under B=2 A, 2.3 A and 2.5 A and the same perpendicular working distance WD, wherein the X axis represents the semi-minor axis A of the reflector 120, and the Y axis represents irradiance. FIG. 4A, FIG. 5A and FIG. 6A respectively show the curves between irradiance and semi-minor axis A when B=2 A, 2.3 A and 2.5 A respectively and WD is 2.5 cm, 5 cm, 7.5 cm and 10 cm respectively.

On the other hand, FIG. 4B, FIG. 5B and FIG. 6B respectively illustrate relative relationships between perpendicular working distance WD and semi-minor axis A when B=2 A, 2.3 A and 2.5 A respectively, wherein the X axis represents perpendicular working distance WD, and the Y axis represents the semi-minor axis A of the reflector 120. From the simulation results, it is known that, when B=2 A, A=0.48WD+1.25; when B=2.3 A, A=0.4WD+1; and when B=2.5 A, A=0.34WD+1.

Figure 7:
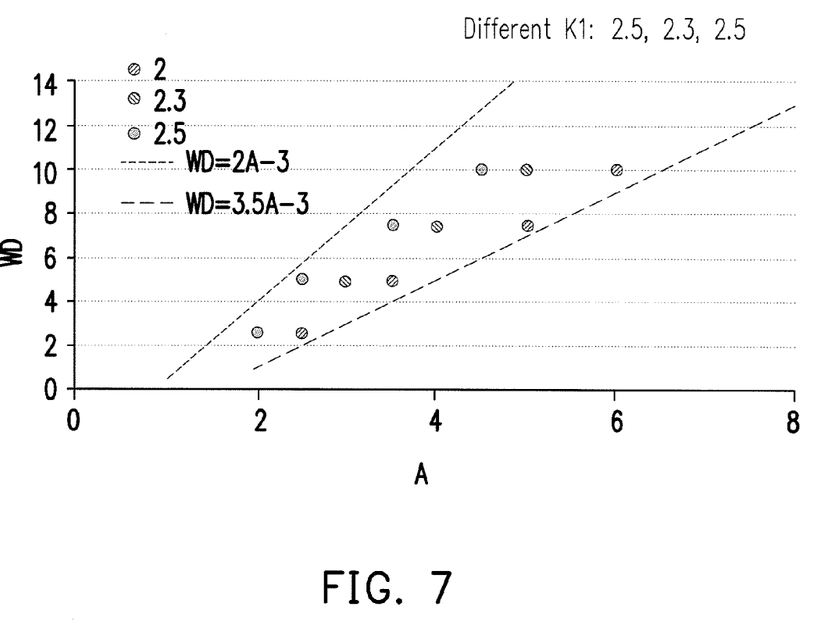
FIG. 7 is a curve diagram illustrating a relationship between perpendicular working distance WD and semi-minor axis A under different semi-major axes B.

For further clarification, Table 2 below shows the experimental data and simulation results of FIG. 4A, FIG. 5A and FIG. 6A. FIG. 7 is a curve diagram illustrating a relationship between perpendicular working distance WD and semi-minor axis A under different semi-major axes B. WD denotes perpendicular working distance, A denotes semi-minor axis, B denotes semi-major axis, K1 denotes a ratio between B and A, and K2 denotes a ratio between WD and A.

TABLE 2

| K1 | | 2 | K1 | | 2.3 | K1 | | 2.5 |
|---|---|---|---|---|---|---|---|---|
| A | WD | K2 | A | WD | K2 | A | WD | K2 |
| 2.5 | 2.5 | 1.00 | 2 | 2.5 | 1.25 | 2 | 2.5 | 1.25 |

TABLE 2-continued

| K1 | | 2 | K1 | | 2.3 | K1 | | 2.5 |
|---|---|---|---|---|---|---|---|---|
| A | WD | K2 | A | WD | K2 | A | WD | K2 |
| 3.5 | 5 | 1.43 | 3 | 5 | 1.67 | 2.5 | 5 | 2.00 |
| 5 | 7.5 | 1.50 | 4 | 7.5 | 1.88 | 3.5 | 7.5 | 2.14 |
| 6 | 10 | 1.67 | 5 | 10 | 2.00 | 4.5 | 10 | 2.22 |

Referring to Table 2 and FIG. 7 together, according to the above, when the perpendicular working distance WD from the transparent cover 110 to the object 10 is known, as long as the semi-minor axis A satisfies WD=2 A-3 to 3.5 A-3 and the semi-major axis B falls within the range of B=2 A to 2.5 A, the irradiance of all the light beams emitted by the light emitting unit 130 can be concentrated on the object 10.

In summary, in the design of the light source module 100 of the invention, the perpendicular working distance WD from the transparent cover to the object, and the semi-minor axis A and the semi-major axis B of the reflector satisfy the following relation: when WD=2 A-3 to 3.5 A-3, and B=2 A to 2.5 A. Thus, when a light beam emitted by the light emitting unit is irradiated onto the object, irradiance of the light beam is more concentrated on the object. In other words, when a specified perpendicular working distance WD is given, the dimensions of the semi-minor axis A and the semi-major axis B of the reflector may be derived. Such design effectively controls the irradiance from the light emitting unit onto the object. Therefore, the light source module of the invention has better working performance.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A light source module adapted to perform a light irradiation process on an object, the light source module comprising:
    a transparent cover;
    a reflector having an elliptical curved surface and covering the transparent cover, the reflector and the transparent cover defining a containing space; and
    a light emitting unit disposed inside the containing space, wherein a specified perpendicular working distance from the transparent cover to the object is WD which is a fixed value, and the specified perpendicular working distance is smaller than or equal to 15 cm, a semi-minor axis of the reflector is A, and a semi-major axis of the reflector is B, wherein WD=2 A-3 to 3.5 A-3, and B=2 A to 2.5 A,
    wherein the light emitting unit is located at a first focus of the elliptical curved surface of the reflector,
    wherein the object is located outside the containing space and at a second focus of the elliptical curved surface of the reflector, and the object is coated with a photopolymer,
    wherein the light emitting unit comprises a plurality of light emitting diodes, and all of the plurality of light emitting diodes are arranged in a column along one direction which is perpendicular to the semi-major axis.

2. The light source module as recited in claim 1, wherein a material of the transparent cover is glass.

3. The light source module as recited in claim 1, wherein the plurality of light emitting diodes are arranged in an array.

4. The light source module as recited in claim 1, wherein each of the plurality of light emitting diodes is a Lambertian light emitting diode.

5. The light source module as recited in claim 1, wherein a ratio between a dimension of each of the plurality of light emitting diodes and the semi-major axis is greater than 0.01.

6. The light source module as recited in claim 5, wherein the dimension of each of the plurality of light emitting diodes is greater than 80 mil.

7. The light source module as recited in claim 1, wherein a light emission axis of each of the plurality of light emitting diodes is parallel to the semi-major axis.

8. The light source module as recited in claim 1, wherein a light emission axis of each of the plurality of light emitting diodes forms an angle with respect to the semi-major axis.

9. The light source module as recited in claim 1, wherein the reflector has a three-quarter elliptical shape formed by extending a semi-elliptical shape.

10. A light source module adapted to perform a light irradiation process on an object, the light source module comprising:
    a transparent cover;
    a reflector covering the transparent cover, the reflector and the transparent cover defining a containing space, wherein the reflector includes a plurality of sub-reflectors having an elliptical curved surface and sharing a common focus; and
    a light emitting unit disposed inside the containing space, wherein a specified perpendicular working distance from the transparent cover to the object is WD which is a fixed value, and the specified perpendicular working distance is smaller than or equal to 15 cm, a semi-minor axis of the reflector is A, and a semi-major axis of the reflector is B, wherein WD=2 A-3 to 3.5 A-3, and B=2 A to 2.5 A, and the light emitting unit is located on the common focus,
    wherein the object is coated with a photopolymer.

11. A method of performing a light irradiation process on an object, comprising:
    providing a light source module that comprises:
        a transparent cover;
        a reflector, covering the transparent cover, the reflector and the transparent cover defining a containing space; and
        a light emitting unit disposed inside the containing space; and
    providing the object that is coated with a photopolymer; and
    the light emitting unit of the light source module irradiating a light beam onto the object so as to perform the light irradiation process,
    wherein when the light beam emitted by the light emitting unit is irradiated on the object, a specified perpendicular working distance from the transparent cover to the object WD is a fixed value, and a semi-minor axis of the reflector A and a semi-major axis of the reflector B are set to satisfy the following relation:
    WD=2 A-3 to 3.5 A-3 and
    B=2 A to 2.5 A, and
    wherein the specified perpendicular working distance WD is smaller than or equal to 15 cm.

* * * * *